J. B. Cornell.

Vault Covers.

No. 441.

Reissued Mar. 24, 1857.

THE NORRIS PETERS CO., PHOTO-LITHO., WASHINGTON, D. C.

UNITED STATES PATENT OFFICE.

JOHN B. CORNELL, OF NEW YORK, N. Y.

IMPROVEMENT IN VAULT-COVERS.

Specification forming part of Letters Patent No. 14,281, dated February 19, 1856; Reissue No. 441, dated March 24, 1857.

*To all whom it may concern:*

Be it known that I, JOHN B. CORNELL, of the city, county, and State of New York, have invented an Improvement in the Illuminating-Covers Used for Closing Openings in Pavements, &c.; and I do hereby declare that the following is a full and exact description thereof, reference being had to the accompanying drawings, making a part of this specification.

My improvement in the said illuminating-covers consists in forming grooves or channels in the upper sides of the metallic portions thereof, around the apertures in said covers which receive the glasses, for the purpose of preventing water or moist earthy matter from standing upon the joints between said glasses and the metallic portions of said covers.

Figure 2:
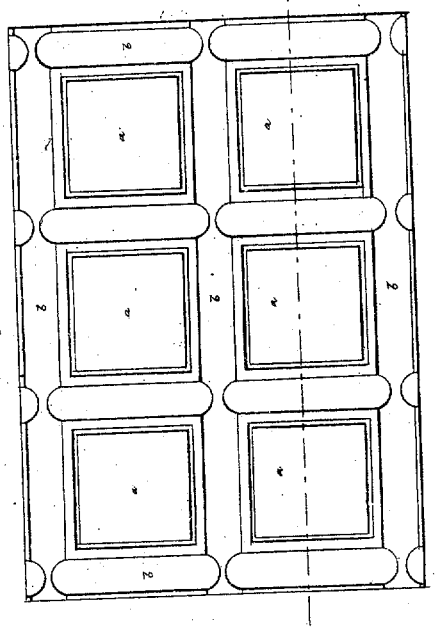
Figure 4:
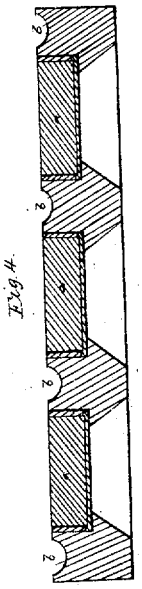
Figure 1:
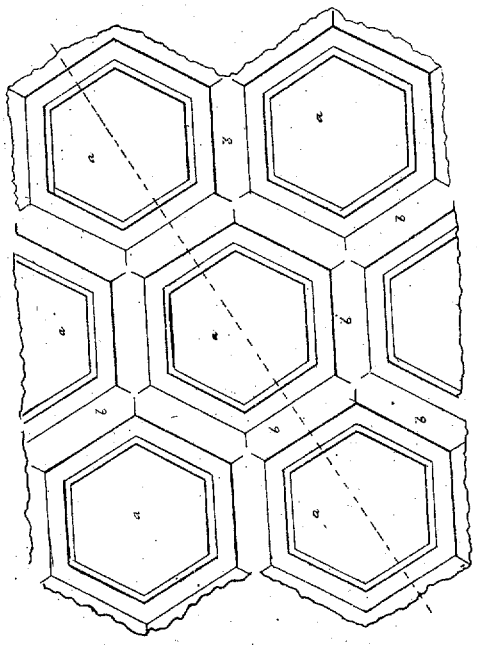
Figure 3:
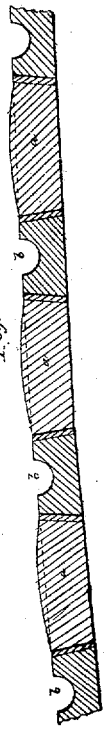

In the accompanying drawings, Figures 1 and 2 are top views of modified forms of my improved illumination-covers, and Figs. 3 and 4 are sections of said covers.

The glasses *a a* may be of any suitable shape, and should be secured within the apertures in the covers in such a manner as to exclude moisture.

The upper faces of the glasses in my improved illuminating-cover should be on a level with the upper face of the metallic portion of the cover, or be raised a little above the same, which will cause the friction of passing feet to keep the faces of said glasses comparatively clean, and also enable a slight shower of rain to perfectly clean the surfaces of said glasses by washing the dirt therefrom into the channels *b b* which surround them. Therefore, if the said improved illuminating-cover be constructed with ordinary skill, it will be perceived that water cannot stand upon the faces of its glasses to injure the joints between them and the metallic portion of the cover, and consequently it must be perfectly water-proof.

What I claim as my invention, and desire to secure by Letters Patent, is—

Grooving or channeling the upper surfaces of the metallic portions of illuminating-covers, substantially in the manner and for the purpose herein set forth; but this I only claim when the glasses in said grooved covers are so arranged as to bring their upper surfaces flush with or a little above the upper surfaces of said covers, substantially as represented in he accompanying drawings.

The above specification of my improvement in the illuminating-covers used for closing openings in pavements, &c., signed this 20th day of February, 1857.

JOHN B. CORNELL.

Witnesses:

WILLIAM W. CORNELL,
JOS. W. MANTERSTOCK.